2,866,802

PREPARATION OF ORGANIC ISOCYANATES

Bruce Graham, Los Altos, Calif., assignor to Ethyl Corporation, New York, N. Y., a corporation of Delaware No Drawing. Application December 27, 1955
Serial No. 555,298

6 Claims. (Cl. 260—453)

This invention is concerned with the production of organic isocyanates and is particularly concerned with the production of these compounds by the reaction of organic halides with metal cyanates in the presence of a catalyst.

The present commercial process for the production of organic isocyanates involves the reaction of phosgene with amine salts. Attempts have been made to produce these isocyanates by the reaction of organic halogen compounds with inorganic cyanates such as those of silver and mercury. For example, silver cyanate reacted with isopropyl iodide produces isopropyl isocyanate, and 1,5-diiodopentamethylene reacted with silver cyanate results in pentamethylene diisocyanate. Certain other isocyanates have been prepared employing silver or mercury cyanate as the reactant. These techniques suffer the drawback of the relative expense of the silver and mercury cyanate to such a degree that they have not been employed commercially.

For this reason attempts have been made to substitute the alkali and alkaline earth metal cyanates for silver and mercury cyanate in such a reaction. These investigations have not proven fruitful since the alkali and alkaline earth metal cyanates are much less reactive and the small amount of products produced comprise the isocyanurates rather than the isocyanates. Specifically, it is known that potassium cyanate will react with highly reactive organic halogen compounds, such as triphenylmethyl chloride, to produce the corresponding isocyanate. However, when attempts are made to react potassium cyanate with the less reactive organic halogen compounds, such as allyl chloride, benzyl chloride, and the like, isocyanurates are obtained as the only product and these in small yields.

A more recent discovery has been to employ specific solvents in the reaction of the alkali or alkaline earth metal cyanates with the less reactive organic halogen compounds to produce the isocyanates. In particular, when a tertiary amide solvent such as dimethyl formamide is employed, it has been discovered that isocyanates are prepared in higher yields than heretofore obtained. This significant discovery is however subject to improvement particularly with regard to the yield of the isocyanate. Accordingly, it is highly desirable to the industry to further improve the reaction of alkali or alkaline earth metal cyanates with organic halides in order to increase the yield of the isocyanate.

It is therefore an object of this invention to provide an improved process for the preparation of organic isocyanates. Another object of this invention is to provide a process for the preparation of the organic isocyanates in high yield and purity. A still further object is to prepare organic isocyanates by the reaction of organic halides with alkali or alkaline earth metal cyanates in the presence of a quaternary ammonium halide as a catalyst. An additional object of this invention is to provide a process for the preparation of organic diisocyanates. These and other objects of the present invention will be apparent from the discussion hereinafter.

The surprising discovery has now been made that organic isocyanates can be prepared in high yield by the reaction of a metal cyanate selected from the group consisting of the alkali and alkaline earth metal cyanates wtih an organic halide having at least one hydrogen atom on the halogen-substituted carbon atom in the presence of a quaternary ammonium halide as a catalyst. The organic halides selected from the group consisting of alkyl, alkenyl, aralkyl, and aralkenyl halides having at least one hydrogen atom and the halogen substituted carbon atom are particularly suitable in the process. In one embodiment the reaction is conducted in the further presence of a solvent. The proportions of the catalyst employed can be varied considerably but for optimum conditions it should be present in amount between about 0.01 to 5 percent by weight. A particularly preferred catalyst is tetraethyl ammonium iodide.

A particular advantage of the process of this invention is that when reacting the lesser reactive organic halides with the alkali metal or alkaline earth metal cyanates in the presence of the quaternary ammonium halide, the yield of isocyanate obtained is substantially increased. In most instances this yield is even doubled over yields obtained by present known methods. Thus, the economics of the reaction are considerably enhanced, and a more economical process suitable to commercialization is provided. These and other advantages will be evident from the discussion hereinafter.

The catalysts which are employed in the process of this invention and which produce the increased yields are the quaternary ammonium halides. These halides can be depicted by the formula $(R)_4-N-X$, wherein R is a monovalent hydrocarbon radical and X is a halogen, preferably selected from the group consisting of chlorine, iodine, and bromine. The monovalent hydrocarbon radicals can be selected from the group consisting of the monovalent aliphatic and the monovalent aromatic radicals. The monovalent aliphatic radicals include monovalent alkyl radicals, such as methyl, ethyl, propyl, isopropyl, butyl, and the like, up to and including those containing 18 carbon atoms. They can be alkenyl radicals such as, for example, ethenyl, propenyl, and the like, up to and including those containing 18 carbon atoms. The monovalent aliphatic radicals can also be cycloalkyl radicals, as, for example, cyclopropyl, cyclobutyl, cycloamyl, and the like, or they can be the cycloalkenyl radicals, such as cyclopentenyl, cyclohexenyl, and the like. When the radicals are monovalent aromatic radicals, they can be monovalent mononuclear or monovalent polynuclear radicals. Typical examples of the mononuclear aromatic radicals include phenyl, o-, m-, or p-ethylphenyl, 2,4-dimethylphenyl, and the like phenyl radicals having one or more substituents such as alkyl, alkenyl, cycloalkyl, and cycloalkenyl radicals bonded to the phenyl radical. Typical examples of the polynuclear aromatic radicals include biphenylyl, $\alpha$-naphthyl, $\beta$-anthryl, 2-methyl-$\alpha$-naphthyl, and the like. It is to be understood that alkaryl, aralkyl, and aralkenyl monovalent radicals can also be employed, as, for example, benzyl, $\alpha$-phenylethyl, $\alpha'$-naphthylmethyl, $\alpha$-phenyl-$\Delta^1$-propenyl, and the like radicals.

One particular criterion of the catalyst to be employed is that it be liquid at the reaction conditions or soluble in the reaction mixture. The R groups can be the same or different. The monovalent alkyl groups are preferred, particularly those containing from 1 to 8 carbon atoms, primarily because of greater availability and improved catalytic effect of the products thereby described. Thus, among the catalysts which can be employed are included tetraethyl ammonium iodide, tetramethyl ammonium bromide, tetrapropyl ammonium bromide, tetrabutyl ammonium iodide, tetraethenyl ammonium bromide, tetraphenyl ammonium chloride, phenyl triethyl ammonium bromide, tetrabenzyl ammonium iodide, tetracyclohexyl ammonium iodide, and the like. Still other such catalysts can be employed, the foregoing being merely a representative list. A particularly efficient catalyst is tetraethyl ammonium iodide.

The proportion of the catalyst to be employed can be varied over a wide range. Some effect is found when only trace quantities are present in the reaction mixture, and likewise, excessive quantities, as about 10 percent by weight or greater based upon the weight of the metal cyanate, can be employed. Primarily because of economical considerations, a preferred range of the catalyst is between about 0.01 to 10 percent by weight of catalyst based upon the weight of the metal cyanate. For optimum conditions not more than about 5 percent by weight based upon the weight of the metal cyanate is employed.

The reaction is best conducted in the presence of solvents in order to provide improved contact between the reactants and more efficient reaction. Many solvents can be employed, and in general the criteria of choice are that they be organic solvents which are liquid under the reaction conditions and are essentially inert to the reactants. The solvents can be, for example, tertiary amides, nitriles, ethers, hydrocarbons, and the like. In most instances an excess of the organic halide is satisfactory as a solvent. Thus, among some of the solvents which can be employed are included dimethyl formamide, dimethyl acetamide, diethyl formamide, and the like tertiary amides; acetonitrile, propionitrile, and the like nitriles; anisole, dioxane, ethylene glycol dimethyl ether, and the like ethers; and benzene, toluene, xylene, kerosene, mineral oil, heavy alkylate, gasoline, octane, and the like hydrocarbons. Still other solvents will be evident to those skilled in the art. In general, it is preferred to employ as the solvent the tertiary amides, an excess of the organic halide, or the hydrocarbons. A particularly suitable solvent is dimethyl formamide.

Now turning to the organic halide reactant, in general, any organic halide can be employed which has at least one hydrogen atom on the halogen substituted carbon atom. Such definition includes compounds having a plurality of halogens provided the carbon atom on which the halogen is substituted has at least one hydrogen atom. Therefore organic halides of this description which can be employed include halo-ethers and thioethers such as di-(chloromethyl) ether of ethylene glycol, di-(chloromethyl) thioether of ethylene glycol and the like; nitriles such as β-chloro-propionitrile, α-chloro-α-chloro-butyronitrile; halo substituted tertiary amines such as 4-chloro-N,N-diethyl butyl amine; nitro substituted hydrocarbon halides such as p-nitro benzyl chloride; and hydrocarbon halides. The organic hydrocarbon halides selected from the group consisting of alkyl (including cycloalkyl), alkenyl (including cycloalkenyl), aralkyl and aralkenyl halides or polyhalides having at least one hydrogen atom on the halogen substituted carbon atom are particularly preferred since the organic isocyanates produced therefrom are of greater stability and more useful in polymer preparation. Stated in another way, the preferred organic halide compounds employed are those compounds containing preferably only hydrogen, carbon, and halogen atoms and the halide function is primary or secondary, preferably the former. Typical but non-limiting examples of these preferred organic halides include benzyl chloride, xylylene dichloride, $\alpha^1$-$\alpha^5$-dichlorodurene, tetramethylene dichloride, n-butyl chloride, allyl chloride, amyl chloride, octyl chloride, hexenyl chloride, β-cyclohexyl-ethyl chloride, 1,4-dichloro cyclohexane, octenyl chloride, and the like, and similar such compounds in which the halide is bromine or iodine. Many other examples will be evident to those skilled in the art.

The alkali and alkaline earth metal cyanates are intended to include sodium cyanate, potassium cyanate, and the like cyanates of lithium, rubidium, cesium, calcium, barium, magnesium, and strontium, or mixtures thereof. The alkali cyanates, especially sodium cyanate, are preferred primarily because of greater availability.

The proportion of the organic halide and the metal cyanate can be varied over a wide range. That is, both the reactants can be used in substantially equimolar proportions, or either the metal cyanate or organic halide can be in excess of between about 0.5 to 25 mole percent and higher. In general, it is preferred that essentially stoichiometric amounts be employed.

The temperature and pressure at which the reaction is conducted is also varied over a wide range. For example, the temperature can be from between about 60 to 230° C. Optimum temperatures have been found to be between about 80 and 170° C. Temperatures below 80° C. result in lower yields, and temperatures above 170° C. should be avoided, since side reactions may occur which would thereby decrease the yield of isocyanate. The pressure employed is generally atmospheric, but subatmospheric or higher pressures, as about 5000 p. s. i. and higher, can be employed.

The length of the reaction time is important toward the production of the isocyanates in high yield. The reaction period can be between about 0.5 and 24 hours. For increased yield of the isocyanate the preferred reaction time is between about 0.5 and 25 minutes. It has been found that reaction times less than about 25 minutes are best suited for the production of the isocyanate in highest yields.

The following examples will further demonstrate the process of the present invention and its advantages over prior art methods. In each instance, all parts are by weight.

*Example I*

To a reactor equipped with an external heating and cooling means and a means for agitation was added 0.2 mole of sodium cyanate and 110 parts of benzyl chloride, the benzyl chloride being in excess to act as a solvent. To this mixture was added 1 part of tetraethyl ammonium iodide. The mixture was mildly agitated and heated to a temperature of between 170 to 173° C. for 1 minute and then immediately externally cooled to room temperature. An aliquot portion of the reaction product, 1 ml., was added to 10 ml. of a standard amine solution prepared by dissolving 25 grams of n-butyl amine in 1 liter of dry dioxane at room temperature. After standing for about 10 minutes this solution was back-titrated with 1 N-HCl. By this method it was determined that the yield of isocyanate was 64 percent by weight based on sodium cyanate. The conversion of sodium cyanate to sodium chloride was complete. The organic material present other than benzyl isocyanate was tribenzylisocyanurate M. P. 156–8.

By way of comparison, when employing the procedure described above, with the exception that 0.2 mole of benzyl chloride and 0.2 mole of sodium cyanate in 95 parts of dimethyl formamide as a solvent in the absence of a catalyst were used, and the reaction temperature was 145° C. for 7 minutes, the yield of isocyanate was only 32 percent.

*Example II*

The procedure of Example I was duplicated essentially as described, employing 114 parts of 1,4-dichlorobutane and 0.2 mole of sodium cyanate in the presence of 1 part of tetraethyl ammonium iodide, with the reaction time being 0.16 hour and the temperature 150° C. In this instance the yield of isocyanate product, as determined by titration, was 52 percent.

Upon duplication of this run under the same conditions, with the exception that the time was 1 hour and no catalyst was present, no isocyanate was obtained.

*Example III*

To the reaction vessel of Example I was added 0.05 mole of $\alpha^1$,$\alpha^5$-dichlorodurene, 0.11 mole of sodium cyanate, 95 parts of dimethyl formamide, and 1 part by weight of tetraethyl ammonium iodide. The procedure was the same as that in Example I, with the exception that the temperature was the reflux temperature of the reaction mixture and it was maintained at this temperature for a period of 1 minute, then cooled to 27° C. within 5 minutes. The yield of isocyanate obtained was 56 percent.

*Example IV*

This example was conducted essentially as described in Example III with the exception that 0.3 mole of $\alpha^1,\alpha^5$-dichlorodurene, 0.75 mole of sodium cyanate, 60 parts of anisole, and 6 parts by weight of tetraethyl ammonium bromide were employed at a reaction temperature of 168° C. for 5 minutes. The yield of isocyanate obtained was 66 percent.

*Example V*

In this run 0.1 mole of xylylene dichloride was reacted with 0.28 mole of sodium cyanate in 24 parts of adiponitrile in the presence of 1 part by weight of tetraethyl ammonium bromide. The reaction vessel was heated to 150° C. and, without control, rose to 220° C., then dropped to 198° C. at the end of 5 minutes, at which time the reaction mixture was cooled as in the above examples. The yield of isocyanate obtained was 48 percent of the theoretical.

The above examples are presented merely as illustrations, and it is to be understood that the metal cyanates, organic halides, quaternary ammonium halides, and solvents described previously can be used with equal effectiveness in the process of this invention.

In further contrast to the above results, when benzyl chloride was reacted with sodium cyanate in the presence of ethylene glycol dibutyl ether for a period of 1 hour at a temperature of 150° C., no yield of isocyanate was detected. A similar result was obtained when this reaction was conducted at a temperature of 175° C. but employing nitrobenzene as the solvent. Likewise, the reaction of 0.35 mole of xylylene dichloride with 0.8 mole sodium cyanate in the presence of 16 parts of acetonitrile for 5 minutes produced at the reflux temperature of the reaction mixture produced no isocyanate.

Thus, from the results shown above it is evident that the quaternary ammonium halides are effective catalysts in the preparation of organic isocyanates by the reaction of organic halides with the alkali or alkaline earth metal cyanates.

The reaction mixture can be employed as such. However, it is preferred to separate the organic isocyanate produced therefrom. One effective method for such separation is to add a minor amount of a polymerization inhibitor such as $PCl_3$, $P_2O_5$, CuCl, and the like inhibitors of isocyanate polymerization to the reaction mixture. The reaction mixture can then be fractionally distilled under vacuum to recover the isocyanate product. Alternatively, and preferably, the organic isocyanate is recovered by adding a liquid hydrocarbon medium such as hexanes, petroleum ether and the like, at a temperature between about 35 to 80° C. usually in an essentially equal proportion by volume, with agitation. The mixture is then cooled and filtered to remove the by-products. Then a polymerization inhibitor, such as those mentioned above, is added to the filtrate and it is fractionally distilled under vacuum to recover the isocyanate product in pure form.

The process of this invention results in products having considerable utility. For example, the monoisocyanates can be employed in condensation reactions with alcohols and amines to result in urethans and ureas. They can also be employed as modifiers of polymers and adhesives. The diisocyanates are useful in the preparation of polymeric materials. For example, they can be employed for the preparation of foamed-in-place resins by either polymerization or copolymerization in the presence of carbon dioxide. Other uses will be evident to those skilled in the art.

Having thus described the process of this invention, it is not intended that it be limited except as set forth in the appended claims.

I claim:

1. A process for the preparation of organic isocyanates which comprises reacting at a temperature below about 230° C. a metal cyanate selected from the group consisting of alkali and alkaline earth metal cyanates with an organic halide selected from the group consisting of alkyl, alkenyl, aralkyl, and aralkenyl halides having at least one hydrogen atom on the halogen substituted carbon atom for a period between about 0.5 minute to 24 hours in the presence of a quaternary ammonium halide having the formula $(R)_4$—N—X, wherein R is a monovalent hydrocarbon radical having up to about 18 carbon atoms and X is a halogen and which is in the liquid state under the reaction conditions as a catalyst.

2. The process of claim 1 in which said metal cyanate is sodium cyanate.

3. The process of claim 1 in which said quaternary ammonium halide is tetraethyl ammonium iodide.

4. A process for the preparation of benzyl isocyanate, which comprises reacting benzyl chloride with sodium cyanate in substantially stoichiometric proportions at a temperature between 80 to 170° C. for a period between about 0.5 to 25 minutes in the presence of dimethyl formamide as a solvent and the further presence of tetraethyl ammonium iodide as a catalyst.

5. A process for the preparation of an organic diisocyanate which comprises reacting $\alpha^1,\alpha^5$-dichlorodurene with sodium cyanate in substantially equimolar proportions at a temperature between about 80 to 170° C. for a period between about 0.5 to 25 minutes in the presence of dimethyl formamide as a solvent and the further presence of tetraethyl ammonium iodide as a catalyst.

6. The process of claim 1 wherein xylylene dichloride is the organic halide, sodium cyanate is the metal cyanate and tetraethylammonium bromide is the quaternary ammonium halide.

No references cited.